United States Patent

Asazuma et al.

[11] Patent Number: 5,680,720
[45] Date of Patent: Oct. 28, 1997

[54] ILLUMINATED SIGNBOARD

[75] Inventors: Harumitsu Asazuma; Hiroshi Koyama, both of Ibaraki, Japan

[73] Assignee: Oji Yuka Goseishi Co., Ltd., Tokyo, Japan

[21] Appl. No.: 762,795

[22] Filed: Dec. 9, 1996

Related U.S. Application Data

[63] Continuation of Ser. No. 451,999, May 26, 1995, abandoned.

[30] Foreign Application Priority Data

Aug. 15, 1994 [JP] Japan ..................... 6-211735

[51] Int. Cl.$^6$ .......................... G09F 13/04; B32B 27/32
[52] U.S. Cl. .................. 40/564; 40/615; 428/318.4; 428/319.7; 428/908; 428/910; 428/34; 428/515
[58] Field of Search ................. 40/541, 564, 603, 40/615; 362/311, 355, 351, 812; 428/515, 516, 323, 330, 537.5, 537.1, 328, 319.7, 318.4, 908, 910, 34

[56] References Cited

U.S. PATENT DOCUMENTS 4,705,719  11/1987  Yamanaka ..................... 428/323
4,795,676  1/1989   Maekawa et al. ............... 428/328

FOREIGN PATENT DOCUMENTS

| A0517109 | 12/1992 | European Pat. Off. . |
| A0631883 | 1/1995 | European Pat. Off. . |
| A1156062 | 6/1989 | Japan . |
| A5072985 | 3/1993 | Japan . |
| A2177049 | 1/1987 | United Kingdom . |

Primary Examiner—Paul J. Thibodeau
Assistant Examiner—D. Lawrence Tarazano
Attorney, Agent, or Firm—Sughrue, Mion, Zinn, Macpeak, & Seas.

[57] ABSTRACT

An illuminated sign board which comprises a film having printing, a frame, and a light source is described. The film is a semi-transparent film made of a stretched resin film containing a finely divided powder of a white inorganic material. The semi-transparent film satisfies the following requirements (1) to (4):

(1) an opacity of from 40% to 70%;
(2) a whiteness of from 80% to 100%;
(3) a total light beam average reflectance of from 30 to 60%; and
(4) a total light beam average transmittance of from 30% to 70%.

2 Claims, 1 Drawing Sheet

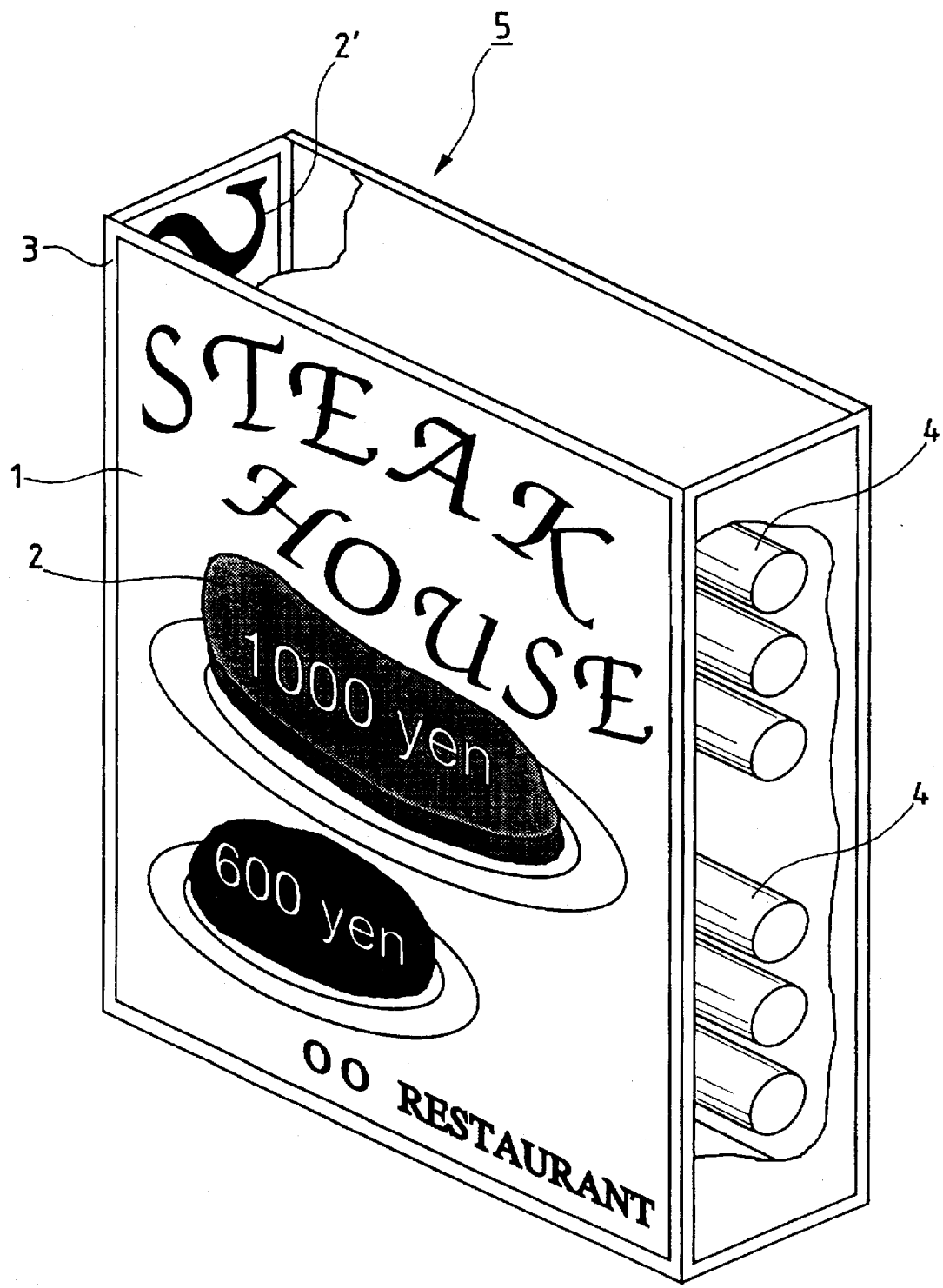

ILLUMINATED SIGNBOARD

This is a Continuation of application Ser. No. 08/451,999 filed May 26, 1995 now abandoned.

FIELD OF THE INVENTION

The present invention relates to a film for use in illuminated signboards displaying menus, prices, etc., for fast food restaurants providing food such as hamburgers, fried chicken, French potatoes, sandwiches, sushi, chow mein, etc.

BACKGROUND OF THE INVENTION

Heretofore, a typical illuminated signboard has comprised a ground glass or semi-opaque high impact polystyrene plate (HIPS plate) having a store's name, telephone number, etc., written with paint thereon so that such letters (and patterns) written on the plate can draw passengers and customers' attention upon illuminating the plate with an electric bulb or fluorescent tube on the other side.

However, with the application of illuminated signboards, at a store or an underpass, to the advertisement of fast food restaurants, department stores, art museums, etc., multi-color printed aesthetical posters have been required. Accordingly, a semi-transparent tracing paper has been employed instead of ground glass or a semi-opaque HIPS plate. It has been a common practice that such semi-transparent tracing paper is subjected to gravure multi-color printing, offset multi-color printing, screen multi-color printing or the like so that when the paper is illuminated by a light source it provides an illuminated signboard.

As such a semi-transparent tracing paper for an illuminated signboard there has been used a synthetic tracing paper having an opacity of from 15 to 35% (as determined by JIS P-8138) which is made of a stretched thermoplastic resin film containing a finely divided powder of a white inorganic material such as calcium carbonate and calcined clay because such a paper exhibits a high bending strength and excellent printability and gives a good print appearance.

In accordance with JIS P-8138, the opacity of paper is determined by applying paper packings of white and black standard plates to a sample and measuring the respective reflectances thereof by using a green filter and expressing the ratio of the latter to the former as a percent to represent opacity, wherein 100% is taken as completely opaque paper. A Hunter reflectometer is used.

For example, JP-A-1-156062 (The term "JP-A" as used herein means an "unexamined published Japanese patent application") discloses the use of, as a paper for an illuminated signboard, a semi-transparent polypropylene resin multi-layer composite film comprising a biaxially stretched resin film made of from 75 to 95% by weight of a polypropylene resin and from 5 to 25% by weight of a high density polyethylene as a substrate layer (A). A monoaxially stretched laminate of a film (B) made of an olefinic resin composition consisting of (a) from 80 to 95% by weight of a polypropylene resin, (b) from 0 to 10% by weight of an olefinic resin selected from the group consisting of high density polyethylene, an ethylene-vinyl acetate copolymer and low density polyethylene and (c) from 5 to 20% by weight of a finely divided powder of an inorganic material and a film (C) made of a polypropylene homopolymer or polypropylene random copolymer is provided on at least one side of the substrate layer (A) in such an arrangement that the monoaxially stretched film of the latter polypropylene homopolymer or polypropylene random copolymer becomes a surface layer. The resulting composite film has an opacity of from 3 to 25% as determined by JIS P-8138 and a gloss of from 65 to 95% as determined on the surface layer (C) side by JIS P-8142.

The foregoing tracing paper is advantageous in that it exhibits an opacity of from 3 to 25% and a whiteness of from 70 to 80% and thus exhibits good transmission of light from the back side thereof and hence gives a bright display of printed letters and patterns. However, some users, particularly fast food restaurants requiring a liver brown color, orange, brown, yellowish brown and black printed display of steak, hamburgers, croquettes, etc., have pointed out that the pattern display should show more brilliant color and finer outlines.

In order to make the outline of printed patterns sharper than that obtained with such a tracing paper, a general-purpose opaque synthetic paper having an opacity of not less than 90% and a whiteness of not less than 80%, e.g., YUPO FPG (trade name of a synthetic paper produced by Oji Yuka Goseishi Co., Ltd.) may be used. However, since such a opaque synthetic paper has an opacity of not less than 90% and a total light beam average transmittance as low as from 8 to 20%, it transmits less light from the back side and thus gives a lower brightness to letters and patterns and looks gloomier as viewed by customers and passengers than tracing paper when used as a poster paper for illuminated signboards.

SUMMARY OF THE INVENTION

An object of the present invention is to provide a film for illuminated signboards which shows no reduction of transmittance of light from the back side thereof even if the opacity thereof is higher than that of conventional tracing paper.

The present invention provides a film for illuminated signboards comprising a semi-transparent film made of a stretched resin film containing a finely divided powder of a white inorganic material, where the semi-transparent film satisfies the following requirements (1) to (4):

(1) an opacity of from 40% to 70%;
(2) a whiteness of from 80% to 100%;
(3) a total light beam average reflectance of from 30% to 60%; and
(4) a total light beam average transmittance of from 30% to 70%.

BRIEF DESCRIPTION OF THE DRAWING

The Figure is a partially cutaway perspective view of an illuminated signboard where the numerals have the following meaning:

1: Semitransparent film
2,2': Print
3: Frame
4: Light source
5: Illuminated signboard

DETAILED DESCRIPTION OF THE INVENTION

The use of a reflective white powder such as titanium oxide and zinc oxide as a finely divided powder of a white inorganic material to be incorporated in the film causes a rise in the opacity of the film but only a small drop in light transmittance, making the outline of printed letters and patterns more sharpener and hence giving a higher brightness to illuminated letters and patterns.

The semi-transparent film for illuminated signboards of the present invention comprises a stretched resin film containing a finely divided powder of a white inorganic material. The semi-transparent film satisfies the following requirements (1) to (4):

(1) an opacity of from 40% to 70% as determined by JIS P-8138;

(2) a whiteness of from 80% to 100% as determined by JIS L-1015;

(3) a total light beam average reflectance of from 30% to 60% as determined by JIS K-7105-1981; and (4) a total light beam average transmittance of from 30% to 70% as determined by JIS K-7105-1981.

Whiteness in accordance with JIS L-1015 is determined by changing a sample into a uniform sliver by combing sufficiently with a hand card, packing the sample into a case at random without arranging the fiber direction insofar as possible so as to pack $0.5 \times \rho g$, where $\rho$ g, where $\rho$ means the density of the fiber (g/cm$^3$), per 1 ml of the case. The front of the sample is closely covered with a standard white surface with a flat, uniform, and transparent glass plate about 1 mm in thickness. Measurement is then conducted by Judd's Method, the Two-Wavelength Method, the Hunter Method, or the Easy Method—Definite Wavelength Method.

For thin test pieces and test pieces whose haze value is small, total light beam average reflectance and total light beam average transmittance in accordance with JIS K-7105-1981 are measured as follows: light transmittance is obtained by measuring the quantity of total transmitted light and the quantity of scattering light by Method A in JIS K-7105-1981 by using an integrating sphere type measuring apparatus, and calculating therefrom the total light transmittance and diffuse transmittance, and then the parallel light transmittance as the difference between those two transmittances. For test pieces where the haze value is large (30% or larger) and the thickness is large (the thickness being 1/10 of the diameter of the aperture of the integrating sphere), the loss of light from the edge due to diffusion of light in the direction of thickness increases, so that the total light transmittance is obtained by Measuring Method B in JIS K-7105-1981, which catches such loss of light. The total light reflectance is obtained by above Measuring Method B, which uses an integrating sphere in which an angle is provided for the center angle of the integrating sphere referring to the optical axis. In above Measuring Method A, a specified light transmittance measuring apparatus is used. In above Measuring Method B, the principle of the optical system of the integrating sphere type measuring apparatus is essentially the same as that in above Measuring Method A, but the construction of the integrating sphere is modified to satisfy certain optical conditions.

A semi-transparent film satisfying these requirements can be prepared by controlling the kind of the finely divided powder of a white inorganic material, the kind of the reflective white powder, quantity of the powder, the kind of the thermoplastic resin, stretching temperature, stretch ratio and thickness of the film.

An example of such a semi-transparent film is a laminated film comprising a biaxially stretched thermoplastic resin film containing from 0 to 40% by weight of a finely divided powder of a white inorganic material as a substrate layer (A) and a monoaxially stretched thermoplastic resin film containing from 0.3 to 5% by weight of a reflective white powder such as titanium oxide and zinc oxide and from 10 to 60% by weight of a finely divided powder of a white inorganic material selected from the group consisting of calcium carbonate, calcined clay, silica and zeolite laminated on both sides thereof as layers (B, B'), where the amounts of the finely divided powder of white inorganic material and the reflective white powder are based on the weight of the resin of the thermoplastic resin film in which the material is present.

An average grain diameter of the reflective white powder is from 0.5 to 2 μm.

As the finely divided powder of white inorganic material to be incorporated in the substrate layer (A) or layers (B, B') there may be used ground whiting, calcined diatomaceous earth, clay, silica, talc, zeolite, titanium oxide, barium sulfate, zinc oxide or the like having an average grain diameter of from 0.03 to 16 μm.

The combination of reflective white powder and finely divided powder of white inorganic material to be incorporated in the layers B, B' is as mentioned above. In particular, the combination of titanium oxide and calcium carbonate or titanium oxide and calcined clay is preferred from the viewpoints of economics and weathering capability.

As the thermoplastic resin to be used in the thermoplastic resin films A, B or B' there may be used a thermoplastic resin having a melting point of not lower than 132° C., preferably from 164° to 250° C. Examples of such a thermoplastic resin include a propylene homopolymer, polypropylene resins such as a propylene-ethylene copolymer, a propylene-butene-1 copolymer, a propylene-ethylene-butene-1 copolymer and a propylene-4-methylpentene-1 copolymer, olefinic resins such as a high density polyethylene having a density of from 0.945 to 0.970 g/cm$^3$ and a poly(4-methyl-pentene-1) resin, polyesters such as polyethylene terephthalate and polybutylene terephthalate, polyamides such as nylon 6 and nylon 6,6, polyphenylene sulfides, and polycarbonates.

These copolymers may be random copolymers or block copolymers.

These thermoplastic resins having a melting point of not lower than 132° C. may be blended with a low melting resin having a melting point of from 80° to 126° C. such as a low density polyethylene having a density of from 0.880 to 0.944 g/cm$^3$, a linear low density polyethylene, an ethylene-vinyl acetate copolymer, an ethylene-acrylic ester copolymer, a salt of an ethylene-methacrylic acid copolymer with metal (e.g., Li, Na, K, Zn, Al), a polystyrene and a petroleum resin in an amount of from 3 to 15% by weight to facilitate the stretching thereof.

The stretching of the film can be accomplished by means of a circumferential velocity difference between rolls, a tenter, a mandrel, or the like. The stretch ratio may be from 3.5 to 7 in the machine direction and from 3.5 to 12 in the transverse direction. The stretching temperature may be such that the resulting semi-transparent film exhibits an opacity of from 40 to 70% (as determined by JIS P-8138), a total light beam average transmittance of from 30 to 70% (as determined by JIS K-7105-1981) and a total light beam average reflectance of from 30 to 60% (as determined by JIS K-7105-1981). For example, if the thermoplastic resin is a propylene homopolymer, the stretching in the machine direction may be effected at a temperature of 5° to 15° C. lower than the melting point of the resin while the stretching in the transverse direction may be effected at a temperature of 2° to 15° C. higher than the melting point of the resin.

The semi-transparent film may have microvoids present therein so that the film is microporous. The percent voids of the semi-transparent film may be from 0 to 15% as calculated by the following equation:

$$\% \text{ Voids} = \frac{\rho_0 - \rho}{\rho_0} \times 100$$

wherein $\rho_0$ represents density of a film before stretching and $\rho$ represents density of the film after stretching.

The semi-transparent film may be a biaxially stretched single layer film. From the standpoint of the bending strength of the film and the surface strength of both of the two surface layers, the substrate is preferably a biaxially stretched film while both of the two surface layers are preferably monoaxially stretched films.

The thickness of the semi-transparent film is from 50 to 150 μm, preferably from 60 to 150 μm. If a laminated structure is used, the thickness of the substrate may account for from 40 to 80% of that of the laminate.

The physical properties of the semi-transparent film are as follows:

(1) an opacity of from 40 to 70%, preferably from 45 to 65%;

(2) a whiteness of from 80 to 100%, preferably from 83 to 90%;

(3) a total light beam average reflectance of from 30% to 60%, preferably from 35 to 58%; and (4) a total light beam average transmittance of from 30 to 70%, preferably from 40 to 60%, where all are measured per the JIS standards earlier given (hereafter the same for these physical properties).

If the opacity exceeds the above defined range, or the total light beam average transmittance and the total light beam average reflectance fall below the above defined ranges, printed letters and patterns on the illuminated signboards look gloomy.

On the contrary, if the opacity and whiteness fall below the above defined ranges, or the total light beam average transmittance and the total light beam average reflectance exceed the above defined ranges, the outline of a yellow, brown, yellowish brown or light brown-colored print is not brilliant.

An illuminated signboard 5 is formed, for example, in the following manner. That is, a product name (menu or résumé), price, store's name, pattern, etc., 2, 2' are printed on either or both sides of a semi-transparent film 1 by a gravure printing method, screen printing method, offset printing method or the like. The printed semi-transparent film 1 is fixed within a frame 3 in such an arrangement that the semi-transparent film 1 is illuminated by a light source 4 such as fluorescent tube, electric bulb, mercury vapor lamp or xenon arc to transmit light.

In the case where printing is made on both sides of the semi-transparent film, a positive pattern 2 is printed on the external surface of the semi-transparent film while printing on the other surface 2' is made using a negative printing plate opposite the printing plate for the external surface of the semi-transparent film.

The present invention will be further described in the following examples.

PREPARATION OF STRETCHED RESIN FILM CONTAINING FINELY DIVIDED POWDER OF INORGANIC MATERIAL

Preparation Example 1

(1) A mixture (A) of 92 parts by weight of a homopolypropylene having a melt index (MI), of 0.8 g/10 min. and melting point of 164° C. and 8 parts by weight of a high density polyethylene was melt-kneaded by means of an extruder, extruded through a die to form a sheet, and then cooled by means of a cooling apparatus to obtain a non-stretched sheet. The sheet thus obtained was heated to a temperature of 155° C. At that temperature it was then stretched by a factor of 5 in the machine direction.

(2) A composition (B) obtained by mixing 56 parts by weight of a homopolypropylene having an MI of 4.0 g/10 min., 40 parts by weight of calcium carbonate having an average grain diameter of 1.5 μm, 0.5 part by weight of an anatase type titanium oxide having an average grain diameter of 0.8 μm and 3.5 parts by weight of a high density polyethylene having a density of 0.960 g/cm³ was melt-kneaded by means of an extruder, and then co-extruded through a die over both sides of the stretched sheet obtained in the process (1). The laminate thus obtained was heated to a temperature of 185° C. where it was then stretched in the traverse direction by a factor of 7.5 to obtain a three layer laminated film.

(3) The surface of the three layer laminated film was then subjected to corona discharge to obtain a laminate of a layer (B) having a thickness of 20 μm, a layer (A) having a thickness of 50 μm, and a layer (B) having a thickness of 20 μm.

The physical properties of the 100 μm thick three layer laminated film are set forth in Table 1.

Preparation Example 2

(1) A mixture (A) of 89 parts by weight of a homopolypropylene having a melt index (MI) of 0.8 g/10 min. (melting point: 164° C.), 8 parts by weight of a high density polyethylene and 3 parts by weight of calcium carbonate powder having a grain diameter of 1.5 μm was melt-kneaded by means of an extruder, extruded through a die to form a sheet, and then cooled by means of a cooling apparatus to obtain a non-stretched sheet. The sheet thus obtained was heated to a temperature of 155° C. where it was then stretched by a factor of 5 in the machine direction.

(2) A homopolypropylene (C) having an MI of 4.0 g/10 min. and a composition (B) obtained by mixing 50.5 parts by weight of a polypropylene having an MI of 4.0 g/10 min., 45 parts by weight of calcined clay having an average grain diameter of 1.2 μm, 1.0 part by weight of titanium oxide having an average grain diameter of 0.8 μm and 3.5 parts by weight of a high density polyethylene having a density of 0.960 g/cm³ were melt-kneaded by means of separate extruders, laminated in a die, and then co-extruded through a die over both sides of the stretched sheet obtained in process (1) in such a manner that the composition (C) layer was outermost. The five layer laminate thus obtained was heated to a temperature of 185° C. where it was then stretched in the transverse direction by a factor of 7.5 to obtain a five layer laminated film.

(3) The surface of the five layer laminated film was then subjected to corona discharge to obtain a laminate of a layer (C) having a thickness of 5 μm, a layer (B) having a thickness of 30 μm, a layer (A) having a thickness of 80 μm, a layer (B) having a thickness of 30 μm, and a layer (C) having a thickness of 5 μm.

The physical properties of the 150 μm thick five layer laminated film are set forth in Table 1.

Preparation Example 3

(1) A mixture (A) of 92 parts by weight of a homopolypropylene having a melt index (MI) of 0.8 g/10 min. (melting point: 164° C.) and 8 parts by weight of a high density polyethylene having a density of 0.960 g/cm³ was melt-kneaded by means of an extruder, extruded through a die to form a sheet, and then cooled by means of a cooling apparatus to obtain a non-stretched sheet. The sheet thus obtained was heated to a temperature of 155° C. where it was then stretched by a factor of 5 in the machine direction.

(2) A homopolypropylene (C) having an MI of 4.0 g/10 min. and a composition (B) obtained by mixing 86.5 parts by weight of a polypropylene having an MI of 4.0 g/10 min., 10 parts by weight of calcium carbonate having an average grain diameter of 1.5 μm, and 3.5 parts by weight of a high density polyethylene were melt-kneaded by means of separate extruders, laminated in a die, and then co-extruded through a die over both sides of the stretched sheet obtained in process (1) in such a manner that the composition (C) layer was outermost. The five layer laminate thus obtained was heated to a temperature of 185° C. where it was then stretched in the transverse direction by a factor of 7.5 to obtain a five layer laminated film.

(3) The surface of the five layer laminated film was then subjected to corona discharge to obtain a laminate of a layer (C) having a thickness of 5 µm, a layer (B) having a thickness of 20 µm, a layer (A) having a thickness of 50 µm, a layer (B) having a thickness of 20 µm, and a layer (C) having a thickness of 5 µm.

The physical properties of the 100-µm thick five layer laminated film are set forth in Table 1.

Preparation Example 4

A synthetic tracing paper "YUPO TPG 75" (trade name) produced by Oji Yuka Goseishi Co., Ltd. was used.

Preparation Example 5

A general-purpose opaque synthetic tracing paper "YUPO FPG 95" (trade name) produced by Oji Yuka Goseishi Co., Ltd. was used.

EXAMPLES 1 AND 2, AND COMPARATIVE EXAMPLES 1 TO 3

A pattern of steak, hamburger, fried potatoes, fried chicken and vegetable salad, food names, and prices were printed on one surface of the semi-transparent films and opaque synthetic papers (1.5 m long×1 m wide) obtained in Preparation Examples 1 to 5 by a 5-color offset printing process. A 5-color (black, yellow, red, blue and purple) offset printing was also performed on the other surface of the semi-transparent films and opaque synthetic papers using a negative printing plate opposite the former printing plate. Thus, poster papers for illuminated signboard were obtained.

These poster papers were each fixed within a frame. Six 40-W white fluorescent tubes were then arranged 5 cm apart from the other surface of the poster papers to obtain illuminated signboards.

These illuminated signboards were installed inside a fast food restaurant and on a footpath at 7 o'clock in the evening. The appearance of these illuminated signboards were then evaluated by ten clerks of the fast food restaurant, five employees of an advertisement agency, and ten other persons. These illuminated signboards were graded from 1st to 5th positions according to their evaluation. The number of votes for these positions were then totalized.

The 1st position, 2nd position, 3rd position, 4th position and 5th position were marked 5 points, 4 points, 3 points, 2 points and 1 point, respectively. These points were totalled for each illuminated signboard (the greater the number of points, the better the "grade" of the product).

The results are set forth in Table 1.

TABLE 1

|  | Example 1 | | Example 2 | | Comparative Example 1 | | Comparative Example 2 | | Comparative Example 3 | |
| --- | --- | --- | --- | --- | --- | --- | --- | --- | --- | --- |
| Preparation example | 1 | | 2 | | 3 | | 4 | | 5 | |
| Thickness (µm) | 90 | | 150 | | 100 | | 75 | | 95 | |
| Opacity (%) | 42 | | 62 | | 12 | | 34 | | 92 | |
| Whiteness (%) | 88 | | 92 | | 91 | | 86 | | 96 | |
| Total light beam average reflectance (%) | 32 | | 55 | | 2 | | 26 | | 85 | |
| Total light beam average transmittance (%) | 65 | | 45 | | 95 | | 74 | | 12 | |
| Tensile strength (kg/15 mm wide) | | | | | | | | | | |
| MD | 8 | | 17 | | 10 | | 6 | | 8.5 | |
| TD | 19 | | 42 | | 25 | | 15 | | 21.5 | |
| Clarke rigidity (kq · cm) | | | | | | | | | | |
| MD | 37 | | 80 | | 50 | | 25 | | 28 | |
| TD | 45 | | 120 | | 60 | | 30 | | 55 | |
| Density (g/cm$^3$) | 1.02 | | 1.02 | | 0.94 | | 1.00 | | 0.77 | |
| Evaluation Installed place | A | B | A | B | A | B | A | B | A | B |
| 1st position (number of persons) | 8 | 9 | 11 | 13 | 1 | — | 5 | 3 | — | — |
| 2nd position (number of persons) | 8 | 8 | 9 | 12 | 2 | — | 6 | 5 | — | — |
| 3rd position (number of persons) | 9 | 8 | 5 | — | 4 | 2 | 7 | 15 | — | — |
| 4th position (number of persons) | — | — | — | — | 18 | 23 | 7 | 2 | — | — |
| 5th position (number of persons) | — | — | — | — | — | — | — | — | 25 | 25 |
| Total | 99 | 101 | 106 | 113 | 61 | 52 | 84 | 84 | 25 | 25 |
| Remarks | — | | — | | JP-A-1-156062 | | YUPO trace "TPG 75" | | YUPO "FPG 95" | |

(Note)
A: inside restaurant
B: on footpath
MD: machine direction
TD: transverse direction The evaluation of the semi-transparent films were various. However, the semi-transparent films of the present invention being reflective and having a little higher opacity than the comparative specimens generally received better evaluation.

The opaque synthetic paper (Comparative Example 3) exhibited a poor light transmission, gave a gloomy appearance of printed letters and patterns and thus were unfavorably evaluated.

The present invention provides an illuminated signboard displaying brilliant yellowish brown, brown, liver brown color and black printed matter with a definite outline without reducing the brightness of the printing.

While the invention has been described in detail and with reference to specific embodiments thereof, it will be apparent to one skilled in the art that various changes and modifications can be made therein without departing from the spirit and scope thereof.

What is claimed is:

1. In a signboard comprising a frame, a semi-transparent film bearing printing thereon and a light source to illuminate said semi-transparent film, the improvement wherein said semi-transparent film is made of a stretched resin film containing a finely divided powder of a white inorganic material, wherein said semi-transparent film satisfies the following requirement; (1) to (4):

(1) an opacity of from 40% to 70%;
   (2) a whiteness of from 80% to 100%;
   (3) a total light beam average reflectance of from 30% to 60%; and
   (4) a total light beam average transmittance of from 30% to 70%.

2. The signboard of claim 1, wherein said semi-transparent film is a laminated film comprising a biaxially stretched thermoplastic resin film containing from 0 to 40% by weight of a finely divided powder of a white inorganic material as a substrate layer, where said substrate layer has laminated on both sides thereof a monoaxially stretched thermoplastic resin film containing from 0.3 to 5% by weight of titanium oxide powder and from 10 to 60% by weight of a finely divided powder of a white inorganic material selected from the group consisting of calcium carbonate and calcined clay.

* * * * *